Figure 6:
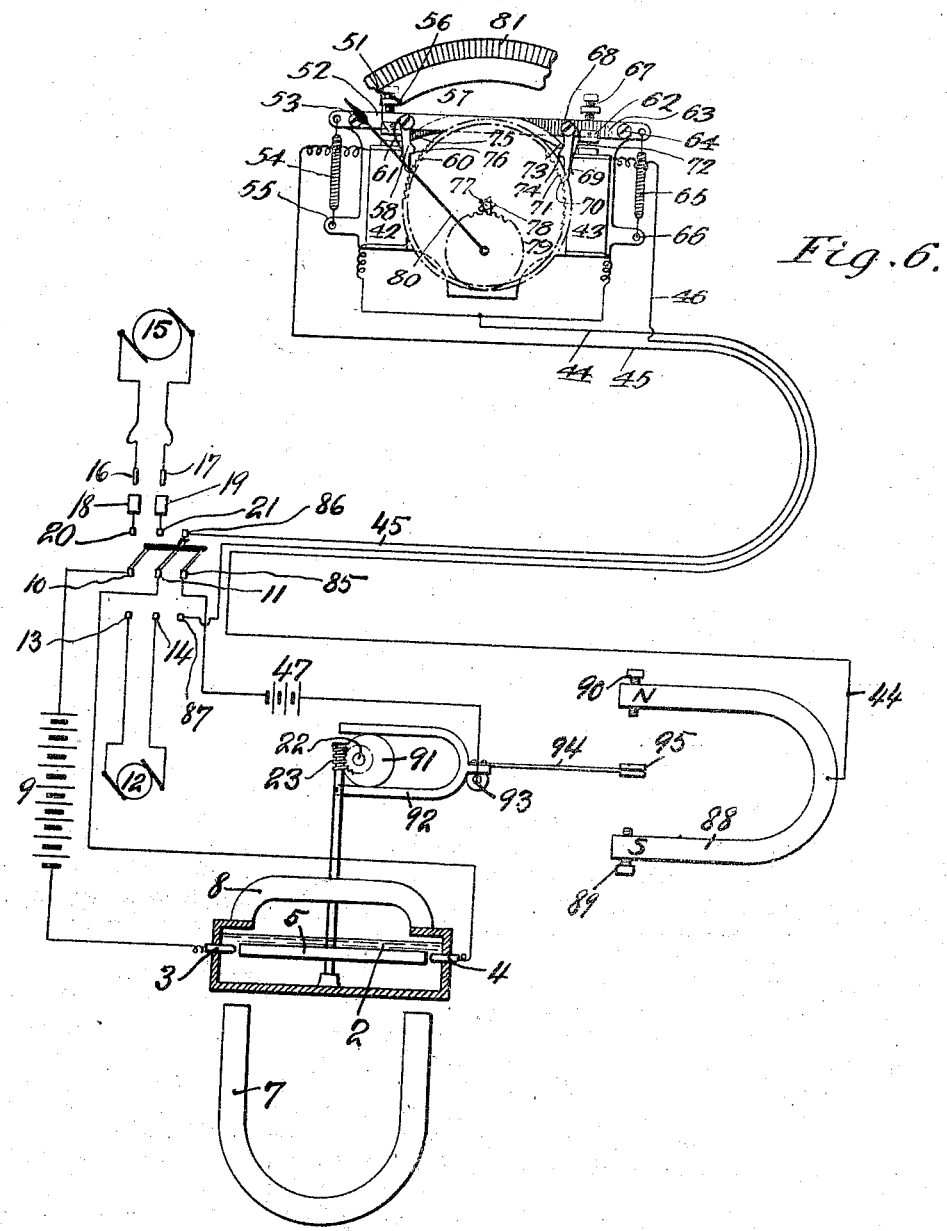

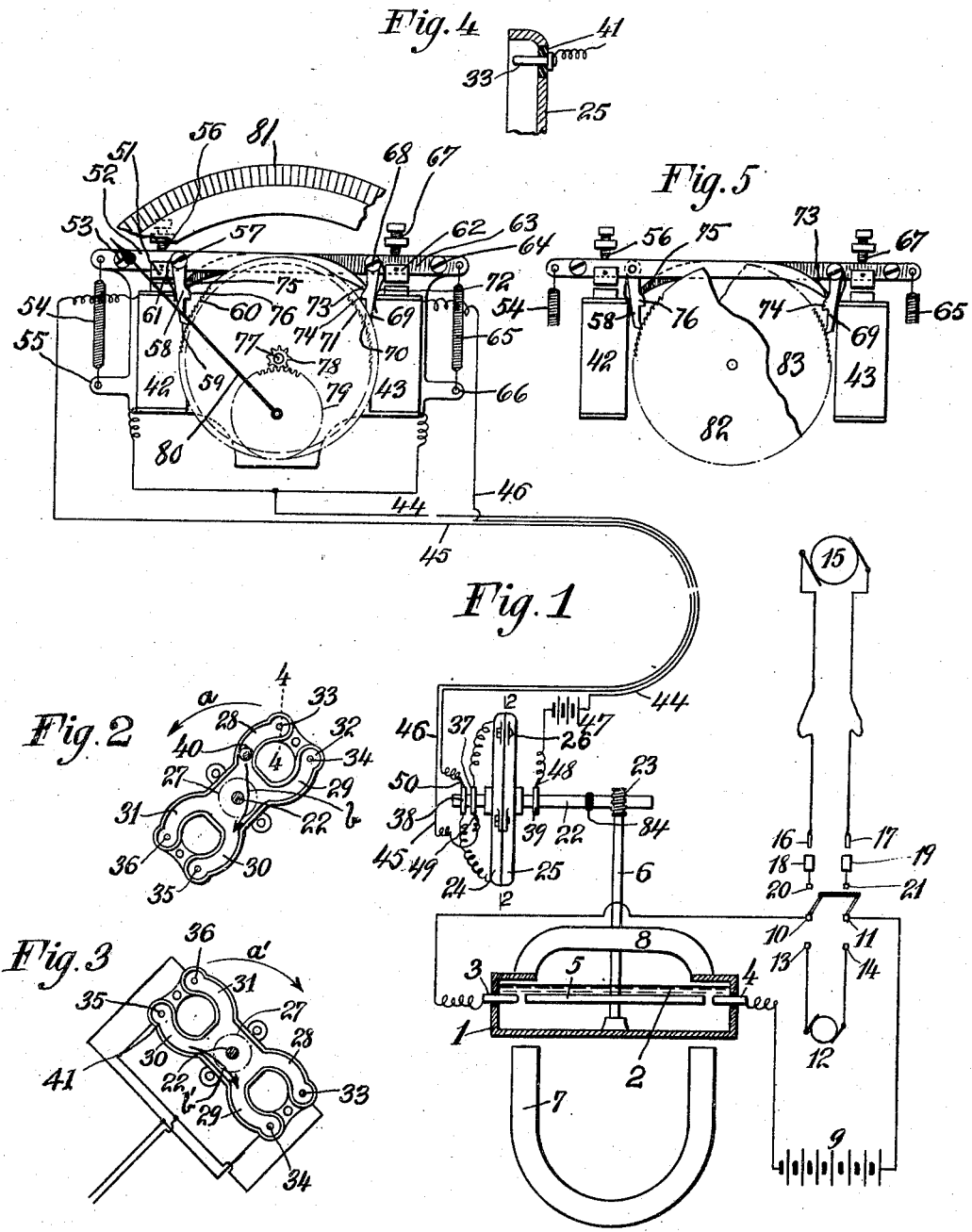

F. W. ROLLER.
ELECTRIC METERING APPARATUS.
APPLICATION FILED JAN. 19, 1911.

1,038,659.

Patented Sept. 17, 1912.

2 SHEETS—SHEET 2.

Witnesses:

Frank W. Roller Inventor

By his Attorneys
Edwards, Sagers & Wooster

UNITED STATES PATENT OFFICE.

FRANK W. ROLLER, OF EAST ORANGE, NEW JERSEY.

ELECTRIC METERING APPARATUS.

1,038,659.　　　　Specification of Letters Patent.　Patented Sept. 17, 1912.

Application filed January 19, 1911. Serial No. 603,484.

*To all whom it may concern:*

Be it known that I, FRANK W. ROLLER, a citizen of the United States, residing at East Orange, in the county of Essex and State of New Jersey, have invented certain new and useful Improvements in Electric Metering Apparatus, of which the following is a full, clear, and exact specification.

This invention relates to apparatus for metering electricity.

The main object is to provide apparatus of the character described in which a motor portion comprising a continuously rotating motor is mechanically dissociated from the indicating portion, the two portions being related by means of electric circuits whereby the operation of the motor portion in obedience to the current to be measured is accurately indicated by the indicating mechanism. It is to be understood that by a continuously rotating motor is meant one in which one direction of rotation continues for at least one complete revolution and ordinarily does not change except upon a change in direction of the electricity to be measured. This dissociation of the indicating and motor portions is of great practical importance in many applications. For instance, in automobiles the motor part may be located under the seat or in any convenient place while the indicating means may be located at a convenient point for viewing it, as on the dash-board of the vehicle.

A further object of the invention is to provide the metering apparatus with mechanically dissociated indicating and motor parts, so organized that the movement of the indicating mechanism reverses with the reversal of movement of the motor. This feature is of practical importance in various uses as in systems employing storage batteries. In such systems a meter may be employed which is actuated by both the charging and discharging currents to and from the battery. The charging current being of the reverse direction from the discharging current, the motor will be rotated in one direction by the charging current and in the other direction by the discharging current.
If the indicating mechanism is so related to the motor mechanism that they change direction of movement together, the current will show the difference between the amount of current which has been charged into the battery and which has been discharged therefrom. By suitably arranging and constructing the indicating mechanism the condition of charge of the battery may be observed. As is well known, the efficiency of the battery is not one hundred per cent. and therefore a less amount of current can be obtained from the battery than that which has been put into it. Accordingly, the charge of the battery will become exhausted upon the withdrawal of a less amount of current from it than that which has been charged into it. In order, therefore, that the indicating apparatus necessary to be viewed in order to ascertain the condition of the charge in the battery, may be simplified the indicating mechanism is made to operate at a less rate on charging than on discharging.

It is, therefore, a further object of the invention to provide means in metering apparatus in which the motor portion and the indicating portion are dissociated, as described, in which the indicating mechanism shall operate at a less rate when the motor turns in one direction from that at which it operates when the motor is turning in the other direction.

Other objects of the invention will appear hereinafter.

In the accompanying drawings which illustrate the invention Figure 1 is a diagrammatic view of apparatus embodying the invention; Fig. 2 is a section on line 2—2 of Fig. 1; Fig. 3 is a view similar to Fig. 1, but in a different position; Fig. 4 is a partial section on the line 4—4 of Fig. 2, showing the manner of mounting the contact pins; Fig. 5 shows a modification of the indicating mechanism actuating means in which difference of rate of operation is obtained by difference in length of stroke of the operating pawls; Fig. 6 is a diagram showing a modified form of contacting device.

Referring to the drawings and first to Figs. 1, 2, 3 and 4, the motor which is actuated by the electricity to be measured comprises a receptacle 1 constructed of suitable insulating material in which are mounted, at diametrically opposite points, the electrical contacts 3 and 4. Between the contacts 3 and 4 is mounted the disk 5 of suitable conducting material, such as copper, this disk being fixed upon the shaft 6 which is rotatably supported. A magnetic field having its lines of force transverse to the disk 5 is created by the permanent horseshoe magnet 7, the magnetic circuit of which is through the magnetic armature 8. The receptacle 1 contains mercury 2 which submerges the contacts 3 and 4 and disk 5. One terminal 4 of the meter motor is connected to one terminal of the storage battery 9, while the other terminal 3 is connected with the contact 10 of a double pole double throw switch as shown. The other terminal of the storage battery is connected to the contact 11 of the switch referred to. 12 represents a motor, as for instance of an automobile, having its terminals connected to the contacts 13 and 14 of the switch referred to. A charging generator 15 has its respective terminals connected to flexible conductors provided with the contacting plugs 16 and 17 which are adapted to be inserted in the contact sockets 18 and 19. These sockets are electrically connected with the switch contacts 20 and 21 of the double pole double throw switch. It will now be apparent that when the double pole double throw switch is thrown downwardly so as to connect the motor 12 with the storage battery, current will flow from the storage battery through the motor 12 to propel the latter, and that the propulsion current will flow through the meter motor which will rotate continuously in one direction at a velocity according to the current flowing through it. If now the double pole double throw switch be thrown upwardly so that the battery circuit is connected with the contact sockets 18 and 19, and the plugs 16 and 17 are inserted in the sockets, the charging generator 15 will be connected in series with the storage battery and current will flow through the same to charge the battery. This charging current will flow in the opposite direction from that of the discharging current employed to operate the motor 12 as before referred to, and therefore the meter motor will rotate continuously in the opposite direction. The meter motor shaft 6 drives the shaft 22 through worm, or other suitable, gearing 23. Mounted upon the shaft 22 is a contact making and breaking device which comprises a hollow casing formed of the two halves 24 and 25 secured together by any suitable means such as bolts 26. This casing is fixed upon the shaft 22 and has the central chamber 27 from which extend the curved channels 28, 29, 30 and 31, each of which channels terminates in a circular chamber as 32. In these four circular chambers at the extremities of the curved channels are contact pins 33, 34, 35 and 36, which are mounted in but insulated from the casing as shown in Fig. 4. Diagonally opposite contact pins are connected together, that is, pins 33 and 35 are connected together and pins 34 and 36 are connected together. The pins 34 and 36 are connected with a slip ring 37 fixed upon but insulated from the shaft 22, while the pins 33 and 35 are connected with the slip ring 38 which is also fixed upon but insulated from the shaft 22. Also fixed upon the shaft 22 and in electrical connection therewith, so that it is electrically connected with the casing formed of the parts 24 and 25, is the slip ring 39. Within the casing formed of the parts 24 and 25 is a globule 40 of mercury which, when in contact with one of the contact pins referred to, serves to bridge the insulation as 41, which insulation serves to electrically separate the pin from the casing, the globule thereby serving to connect the pin with the casing. It will further be observed that as the casing rotates with the shaft 22 the globule shifts its contact from one pin to another thereby making and breaking the circuit at the different pins. An insulating section 84 is inserted in the shaft 22 to electrically separate the motor from the contacting device. In order that the operation of the contact making and breaking device just referred to may be clearly understood, let it be assumed that the device is rotating in the direction of the arrow $a$ as shown in Fig. 2 and prior to the position shown in Fig. 2, the mercury globule is in the circular chamber containing the pin 33. Up to this position as shown in Fig. 2 the globule has been in close contact with the pin 33, electrically connecting it with the casing. In the position shown in Fig. 2, however, the globule will quickly leave the pin 33 and, traversing the channel 28 will pursue the path as indicated by the arrow $b$ across the chamber 27, will traverse the channel 30, and enter the circular chamber at the end of that channel which contains the pin 35, and will connect that pin with the casing. The globule will remain thus in contact with the pin 35 and the casing until, in the revolution of the device, the globule will leave the pin 35 and, traversing the channels 30 and 28 will again come in contact with the pin 33 and connect it with the casing. It will thus be apparent that so long as the direction of rotation of the device continues to be that indicated by the arrow $a$ in Fig. 2, that the pins 33 and 35 will be alternately connected and disconnected with the casing. If, however, the direction of rotation changes to that indicated by the arrow in Fig. 3, the conditions will be such that the pins 34 and 36 will be alternately connected and disconnected with the casing. Thus if we consider the contacting device in the position as shown in Fig. 2 and the mercury globule in contact with the pin 35, as the rotation of the device takes place in the direction of the arrow $a'$ in Fig. 3, the globule will remain in contact with the pin 35 until a certain point of the rotation is reached when the globule will quickly leave the pin 35 and, passing over the shoulder 41 will enter the channel 30. When the rotation has continued until the position as shown in Fig. 3 has been reached, the globule will leave the channel 30 and, taking a path through the central chamber 27 as indicated by the arrow $b'$ in Fig. 3, it will traverse the channel 29 and establish contact with the pin 34. Then as the rotation of the device continues in the direction of the arrow $a'$ in Fig. 3 the globule will alternately make and break contact with the pins 34 and 36 in a manner similar to that described in connection with the pins 33 and 35. The indicating mechanism comprises two stationary coils 42 and 43 each having a terminal connected to the common wire 44 in the electric cable which connects the indicating mechanism with the motor apparatus from which it is mechanically dissociated. The other terminals of the coils 42 and 43 are respectively connected to the wires 45 and 46 of this cable. The wire 44 leads through a battery 47 to the brush 48 bearing upon the slip-ring 39 while the conductors 45 and 46 are respectively connected to the brushes 49 and 50 which respectively bear upon the collector rings 37 and 38. The coil 42 has a magnetic armature 51 fixed to an arm 52 pivoted at 53 to a stationary portion of the apparatus. To the tail of the arm 52 is secured one end of a spring 54, the other end of said spring being secured at 55 to a stationary part of the apparatus. This spring tends to pull down the tail end of the arm 52 and to elevate the portion of the arm on the other side of its pivot from the spring. The upward movement of the arm under the influence of the spring 54 is limited by an adjustable stop 56 screw threaded in a stationary portion of the apparatus. Pivoted at 57 upon the arm 52 is a pawl 58 having its nose 59 pressed toward the ratchet teeth 60 of the ratchet wheel by a spring 61. The coil 43 has a magnetic armature 62 fixed to the arm 63 pivoted at 64 to a stationary part, the portion of the arm at the left hand of the pivot 64 tending to be raised by the spring 65 which extends between the tail end of the arm 63 and a stationary part 66. The upward movement of the arm 63 is limited by the adjustable stop 67 which is shown as a screw threaded into a stationary part. At 68 a pawl 69 is pivoted to the arm 63, this pawl having its nose 70 pressed toward the ratchet teeth of a wheel 71 by a spring 72. The tip 73 of the arm 52 engages the lug 74 on the pawl 69 so that when this tip moves downwardly the nose 70 of the pawl will be forced out of engagement with the ratchet teeth 71. Similarly the tip 75 of the arm 63 engages with a lug 76 upon the pawl 58 so that the nose 59 is moved out of engagement with the ratchet teeth 60 when the tip 75 is moved downwardly. The ratchet wheels respectively carrying the teeth 60 and 71 are of different diameters as shown and are fixed side by side upon a rotatably mounted shaft 77. Also fixed upon the shaft 77 is a small pinion 78 which engages with the rotatably mounted pinion 79 of a much larger size than the pinion 78 so that a given angular movement of the pinion 78 produces a very much smaller angular movement in the pinion 79. Fixed to the pinion 79 is a pointer 80 passing over a suitably calibrated scale 81. It now being assumed that the adjusting screws 56 and 67 are adjusted to give equal strokes of the pawls 58 and 69, if the magnet 43 be energized it will attract its armature 62, drawing the same down against the tension of the spring 65, thereby causing a forward stroke of the pawl 69 and advancing the ratchet teeth forward, turning the pinions 78 and 79 and causing the pointer 80 to move over the scale 81. Upon deënergization of the coil 43, the pawl 69 will be retracted to be in a position to again make a forward stroke resulting in movement of the pointer over the scale as just described. The movement of the pointer over the scale, therefore, will depend upon the rapidity with which the coil 43 is energized and deënergized. Similarly the pawl 58 will be oscillated according to the energization and deënergization of the coil 42. As this pawl 58 is oscillated it will turn the ratchet wheel carrying the teeth 60 step by step and, since the ratchet teeth 60 are oppositely directed to the teeth 71, the shaft 77 and the pointer 80 will be turned in opposite directions when actuated by the pawl 58 from the directions in which they move when actuated by the pawl 69. It will further be observed that the diameter of the wheel carrying the ratchet teeth 60 is of larger diameter than the wheel carrying the ratchet teeth 71 and therefore, for a given length and frequency of stroke of the pawl, the pointer 80 will be moved over the scale 81 at a greater speed by the pawl 69 than by the pawl 58.

Now, in order to illustrate the operation of the apparatus of Fig. 1 as a whole, let it be assumed that the switch blades pivoted to the contacts 10 and 11, are thrown upwardly so that these blades come respectively into engagement with the contacts 20 and 21. It will, of course, be understood that these switch blades are insulated from each other. Also assume that the plugs 16 and 17 are inserted in the sockets 18 and 19. Circuit is now completed through the charging generator 15, the storage battery 9, and the meter, the circuit through the meter being made through the stationary contacts 3 and 4, the armature 5 and the mercury in which the said contacts and armature are immersed. The charging current will then flow from the charging generator 15 through the storage battery 9. This current will be in a certain direction and will cause the rotation of the armature 5, in a certain direction, which rotation will continue as long as the direction of the current is unchanged. This direction of rotation of the meter will produce a direction of rotation of the contact making and breaking device carried by the shaft 22 as indicated by the arrow a' in Fig. 3, the mercury globule 40 making and breaking contact at the pins 34 and 36 alternately. When the globule is in contact with either of these pins, circuit will be completed from one terminal of the coil 42, through the conductor 45, brush 49, slipring 37, one of the pins 34 or 36, the mercury globule 40, the casing of the make and break device, shaft 22, slip-ring 39, brush 48, battery 47, and conductor 44 to the other terminal of the coil 42. With the circuit thus made the coil 42 is energized, drawing down the arm 52 against the tension of the spring 54 and causing a forward stroke of the pawl 58. When, however, the globule 40 is out of contact with either of the pins, the circuit of the coil 42 is broken, the arm 52 is retracted by the spring 54 and the pawl 58 makes its return stroke. It will be apparent that the number of strokes of the pawl, and therefore the speed with which the pointer 80 moves over the dial 81 will depend upon the frequency of energization and deënergization of the coil 42. This is in turn dependent upon the speed of rotation of the make and break device upon the shaft 22 which in turn is dependent upon the speed of the shaft 6 driven by the armature 5 and, as is well known, the speed of the armature 5 depends upon the amount of current flowing through it. If it be desired to operate the motor 12 by current discharged from the battery 9, the switch pivoted to the contacts 10 and 11 is thrown downwardly so that its blades engage respectively with the contacts 13 and 14 when circuit will be completed through the storage battery 9, the armature 5 of the meter and the motor 12. The current now being discharged by the battery is in the opposite direction from the charging current which was supplied by the charging generator 15 and therefore the armature 5 of the meter motor will rotate in the opposite direction at a speed proportional to the amount of current flowing through it. The make and break device upon the shaft 22 will therefore have its direction of rotation reversed so that it will rotate in the direction of the arrow a in Fig. 2. Circuit will then be alternately made and broken at the pins 33 and 35 as has been described. When the globule is in contact with one of the pins circuit can be traced from one terminal of the coil 43 through the conductor 46, brush 50, slip-ring 38, one of the pins 33 or 35, the casing of the make and break device, shaft 22, slip-ring 39, brush 48, battery 47, and conductor 44 to the other terminal of the coil 43. With the circuit thus made the coil 43 will be energized and the arm 63 drawn downwardly to give a forward stroke to the pawl 69. On deënergization of the coil 43 the spring 65 will retract the arm 63 and its pawl. It will be apparent, as in the case of the coil 43, that the speed with which the pointer 80 is moved depends upon the frequency of the energization and deënergization of the coil 43, which frequency is dependent upon the speed of rotation of the make and break device upon the shaft 22 which in turn is dependent upon the speed of the armature 5. It will be observed that while the battery 9 is being charged, the pointer 80 will be moved toward the right over the dial 81 at a certain speed for a given flow of charging current while the pointer is moved in the opposite direction over the dial at a different rate when the battery is discharging current. By suitably relating the sizes of the ratchet wheels of the indicating mechanism, the difference in rate of indicating charging and discharging currents can be made such that the discrepancy between the amount of current which can be obtained from the battery and that which must be charged into it to secure that amount of discharge, will be compensated for and the indicator will show the true condition of charge of the battery.

In Fig. 5 is shown a modification of the indicating mechanism in Fig. 1, in which, instead of depending upon different sized ratchet wheels for producing different rates of indication, as is done in Fig. 1, two ratchet wheels 82 and 83 of the same size are employed and the different rates are secured by adjusting the pawls 58 and 69 to different lengths of stroke to accomplish the desired difference in rate. This difference in length of stroke may be secured by suitably adjusting the screws 56 and 67. Except for the difference noted, the mechanism of Fig. 5 is exactly the same as the indicating mechanism of Fig 1 and operates in the same way. The ratchet wheels of the indicating mechanism in both Figs. 1 and 5 are provided with fine teeth so that one stroke of a pawl will carry it over several teeth and the movement of the wheel at a stroke can be adjusted by varying the number of teeth covered by a stroke of the pawl.

Referring to Fig. 6 of the drawings, the indicating mechanism, which may be the same as that in Fig. 1 and is so shown, comprises the coils 42 and 43 from which the flexible cable including the wires 44 45 and 46 extend as in Fig. 1. Also, as in Fig. 1, there are the charging generator 15 with its plug and socket contacts 16, 17, 18 and 19, the motor 12, the storage battery 9, the double throw switch having contacts 10, 11, 13, 14, 20 and 21, the battery 47 for energizing the magnets 42 and 43 and the meter motor comprising the magnetic field parts 7 and 8, contacts 3 and 4 and the armature 5, the shaft 22 being driven through worm gearing 23. This shaft 22, drives a contact making and breaking device of a different construction from that shown in Fig. 1, which may be insulated from the motor by an insulated section in the shaft as in Fig. 1. Also in Fig. 6, contacts 85, 86 and 87 and a blade for engagement therewith are added to the switch for connecting the storage battery with the charging generator or the driven motor as may be desired. It will, of course, be understood that in the apparatus of Fig. 6, as in the apparatus of Fig. 1, the switch blades are insulated from each other and each is pivoted to a central contact.

The contact making and breaking device of Fig. 6 comprises an eccentric or cam 91 fixed upon the shaft 22 and located between the tines of a fork 92, which is pivoted at 93, so that the fork 92 moves up and down in an oscillating movement about the pivot 93 as the shaft 22 rotates. Secured to the fork 92 and extending to the right of the pivot 93 is a steel spring 94 preferably reinforced at its end by contact pieces 95, although such contact pieces may be omitted and contact made directly with the spring 94. The spring extends between the poles of a permanent magnet 88 of horseshoe form, adjustable contact screws 89 and 90 being provided in the extremities of the magnet. Electrical connection is formed through the magnet 88 by means of a conductor 44. Also it will be observed that one terminal of the battery 47 is connected with the spring 94. The spring 94 being in the mid-position, as shown in Fig. 6, rotation of the cam 91 will operate to bring the spring 94 closer to one of the contacts 89 or 90, say 89, and when the spring has been moved close enough to the pole of the magnet 88 which carries this contact, the magnetism will overcome the tension of the spring 94 and quickly draw the spring into engagement with the contact 89 so that electrical connection will be established from the battery 47 to the conductor 44. As the rotation of the cam 91 continues, the spring 94 will tend to move away from the contact 89 and the spring 94 will be tensed until such a point is reached that the magnetism is no longer of sufficient strength to held the spring against the contact 89, when the spring will quickly fly away from its stationary coöperating contact and the circuit between the spring and the magnet will be broken. The dimensions of the apparatus are such that when the spring 94 flies away from the contact 89, it will not approach so near to the opposite contact 90 as to be at once drawn into contact therewith, but will remain for a certain period out of contact with either of the contacts 89 or 90. As the cam 91 rotates still further the spring 94 will be caused to approach closer to the contact 90 until, when a certain point is reached, the magnetism of that pole will draw the spring into engagement with the screw 90 when circuit will again be established. As the rotation of the cam progresses the spring 94 will be tensed until it reaches a point at which it will overcome the magnetic attraction and the spring 94 will fly quickly away from the contact screw 90. In this way, as the cam 91 rotates, the spring 94 will be brought alternately into engagement with the contact screws 89 and 90. Let it now be assumed that it be desired to charge the battery 9 from the generator 15. The switch will accordingly be thrown upwardly so as to connect the contacts 10 and 20 together, the contacts 11 and 21 together, and the contacts 85 and 86 together. Circuit may then be traced through the generator 15, contacts 3 and 4, armature 5, the meter and the storage battery 9. The armature 5 will, therefore, rotate in a given direction with a speed proportional to the charging current flowing through it. It will be apparent that the cam 91 will rotate and the spring 94 will make and break the circuit through the wire 44 with a frequency proportional to the speed of the armature 5, i. e., to the amount of current passing through the armature. When the circuit is completed through the spring 94 and either of the contacts 89 or 90, circuit may be traced from one terminal of the battery 47 through the spring 94, through the magnet 88, the conductor 44, the magnet 42, the conductor 45, and switch contacts 86 and 85, to the other terminal of the battery 47. It is apparent, therefore, that as the circuit is made and broken by the spring 94 that the pointer will be moved over the scale by reason of the energizing and deënergizing of the magnet 42, as described in connection with the indicating mechanism of Fig. 1, and that this energizing and deënergizing is of a frequency dependent upon the frequency of the making and breaking of the connection by the spring 94, which is proportional to the current flowing through the meter motor armature as has been pointed out. Should it now be desired to operate the motor 12 by current discharged through it by the storage battery 9, the triple pole double throw switch will be thrown downwardly, thereby connecting the switch contacts 10 and 13, connecting the switch contacts 11 and 14 and connecting the contacts 85 and 87. Circuit may then be traced through the storage battery 9, the motor 12, and the meter armature 5, when this armature will rotate in the opposite direction from that just considered and at a speed proportional to the discharge current passing through it. In a similar manner to that described in connection with the opposite direction of rotation of the meter, the circuit of the battery 47 will be alternately made and broken at the contacts 89 and 90. With the switch shown as described, however, the circuit of this battery will not pass through the magnet 42 as previously, but will now pass through the magnet 43 by a circuit which may be traced from one terminal of the battery 47 through the spring 94, one of the contacts 89 or 90, conductor 44, magnet 43, conductor 46, switch contacts 87 and 85 to the other terminal of the battery 47. The magnet 43 will, therefore, be energized and deënergized as the circuit is made and broken by the movement of the spring 94 and these energizations and deenergizations of the magnet 43 will operate as explained in connection with the indicating mechanism in Fig. 1 to turn the pointer over the dial in the direction opposite to that in which it was turned by the action of the magnet 42.

While the invention has been illustrated in what is considered its best applications it is to be understood that the forms shown are merely illustrative and the invention is therefore not limited to the structures shown in the drawings.

Having thus described my invention I declare that what I claim as new and desire to secure by Letters Patent is:—

1. In an electric metering apparatus, the combination with a motor element comprising a continuously rotating motor actuated by the current to be measured, indicating mechanism mechanically dissociated from said motor element and electrical means for controlling said mechanism according to the operation of said motor, said electrical means comprising conductors extending from said motor element to said indicating mechanism and means for reversing the indicating mechanism when the rotation of the motor is reversed.

2. In an electric metering apparatus, the combination with a motor element comprising a continuously rotating motor actuated by the current to be measured, indicating mechanism mechanically dissociated from said motor element and electrical means for controlling said mechanism according to the operation of said motor, said electrical means comprising conductors extending from said motor element to said indicating mechanism and means for automatically reversing the indicating mechanism when the rotation of the motor is reversed.

3. In an electric metering apparatus, the combination with an indicating element comprising an indicator and mechanism for operating said indicator in both directions but at a different rate in one direction from that in the other, of a motor element mechanically dissociated from said indicating element, comprising a motor adapted to be actuated by current to be measured and electrical means for controlling the operation of said mechanism in both directions of movement of the indicator according to the operation of said motor, said electrical means comprising conductors extending from said motor element to said indicating element.

4. In an electric metering apparatus, the combination with an indicating element comprising an indicator and mechanism for operating the same, of a motor element mechanically dissociated from said indicating element, comprising a motor adapted to be actuated by the current to be measured and a contacting device driven by said motor, and electrical conductors extending from said contacting device to the indicating mechanism, said contacting device comprising a contact and a second contact movable toward and away from the aforesaid contact to make and break the circuit therethrough and means for causing said second contact to move away from the other contact at a greater speed than it is driven by said motor.

5. In an electric metering apparatus, the combination with an indicating element, of a motor element mechanically dissociated therefrom, said motor element comprising a motor adapted to be actuated by the current to be measured and a contacting device actuated by said motor, and conductors extending from said contacting device to said indicating element, said contacting device comprising means for producing a magnetic pole, an elastically mounted contacting member adapted to be moved into and out of the attractive influence of said pole and means whereby said contact member is driven by said motor.

6. In an electric metering apparatus, the combination with an indicating element comprising an indicator and mechanism for operating the same, of a motor element mechanically dissociated therefrom, said indicating element comprising a motor adapted to be actuated by the current to be measured and a contacting device driven by said motor, and electrical conductors extending from said contacting device to the indicating mechanism, said contacting device comprising a contact and a second contact movable toward and away from the aforesaid contact to make and break the circuit therethrough and means for storing energy and liberating the same at the time said contacts are separated to increase the speed of movement of one contact away from the other over that at which it is driven by said motor.

7. In an electric metering apparatus, the combination with an indicating element comprising an indicator, pawl and ratchet mechanism for driving said indicator, electric coils for operating said mechanism to move said indicator in different directions respectively, of a motor element mechanically dissociated from said indicating element, comprising a motor adapted to be actuated by current to be measured, a contacting device driven by said motor and controlling the circuits of said electric coils, and electrical conductors extending from said contacting device to said coils.

8. In an electric metering apparatus, the combination with an indicating element comprising an indicator, pawl and ratchet mechanism for driving the same, and two electric coils adapted to operate said mechanism to drive said indicator in opposite directions respectively, the said indicator being driven by one coil at a different rate from that which it is driven by the other, of a motor element mechanically dissociated from said indicating element comprising a motor adapted to be actuated by current to be measured, a contacting device driven by said motor and controlling said electric coils, electrical conductors extending from said motor element to said indicating element, said contacting device closing the circuits of the said two electric coils respectively according to the direction of rotation of said motor.

In testimony whereof I affix my signature in presence of two witnesses.

FRANK W. ROLLER.

Witnesses:
 THOMAS HOWE,
 WM. G. WALKER.

---

Copies of this patent may be obtained for five cents each, by addressing the "Commissioner of Patents, Washington, D. C."